United States Patent Office 2,940,954
Patented June 14, 1960

2,940,954

WATER-SOLUBLE PHENOL-FORMALDEHYDE CONDENSATION PRODUCTS

Eugene A. Barr, Somerville, and Victor Auerbach, North Plainfield, N.J., assignors to Union Carbide Corporation, a corporation of New York No Drawing. Filed May 24, 1954, Ser. No. 432,062

5 Claims. (Cl. 260—59)

This invention relates to the production of improved water-soluble phenol-formaldehyde condensation products characterized by heat-hardening more rapidly to an infusible form and in higher yields than hitherto known products of this type.

When phenol is condensed with at least and preferably more than an equimolar amount of formaldehyde in the presence of an alkaline catalyst, there are obtained condensation products generically known as resoles. Depending on the extent of the condensation reaction, the resoles may be liquid products infinitely or only partly soluble in water, or brittle resins insoluble in water.

The water-soluble resoles find wide application in industry. Annually millions of pounds of water-soluble resoles are consumed as binders in the production of glass and mineral wool insulation batts, as adhesives in plywood manufacture, and as impregnants for paper laminates. For these applications it is often desirable to reduce the viscosity of the water-soluble resoles by the addition of a volatile solvent to facilitate impregnation or coating. Water is most often used for this purpose because of its cheapness and reduction of fire hazard in preference to volatile and inflammable expensive organic solvents such as methyl or ethyl alcohols, benzol or ketones.

Industrial consumers of water-soluble resoles in their constant quest to reduce manufacturing costs have long been wanting a resole product which could be heat-cured to infusibility more rapidly than the conventional water-soluble resole, and of even greater importance a resole which would produce higher yields of infusible solid resin even when heat-converted at such extremely high temperatures as 200° C. and higher. The latter desideratum is of particular concern in the mineral fiber insulation batt industry which use phenol-formaldehyde resoles as binders for mineral fibers to form integral fiber batt constructions.

Generally an aqueous resole solution is sprayed onto a mass of mineral fibers, and the mass then heated to cure the resole to a heat-hardened or "C" stage condition. Since in such applications the resole is spread around the fibers as extremely thin films, and furthermore is subjected to relatively high curing temperatures of the order of 200° C. and higher in the interest of rapid production, a significant amount of the more volatile resole components are volatilized and less of the resole is converted to infusible solids than would occur by converting at lower temperatures (e.g. 149° C.) and/or in bulk form.

The volatile matter released during the overall spraying and curing under the exposed conditions of mineral fiber bonding usually comprises unreacted phenol, unreacted formaldehyde, low-molecular weight phenol-formaldehyde condensation products such as saligenin (orthohydroxybenzyl alcohol) and quite possibly resole decomposition products including formaldehyde.

The problem of volatile losses in mineral fiber bonding operations is of sufficient magnitude to have stimulated the development of special forms of apparatus for determining the total amount of resole products that are volatilized during application to mineral fibers. One form of such apparatus presently in use by the mineral fiber industry is described by Simison in U.S. Patent 2,653,473. Briefly, the apparatus comprises a tubular chamber adapted to support therein a cone shaped mass of mineral fibers, means for spraying the cone with an aqueous solution of resinous binder and means for supplying heated air to heat-convert the sprayed binder.

The application efficiency of a resin binder solution in the "cone" test is calculated as follows:

$$\text{Percent } E = \frac{W}{G \times V \times S} \times 100$$

wherein E is the efficiency; W the increase in the weight of the fibrous cone; G the specific gravity of the binder solution; V the volume of the resin solution used in spraying the cone; and S the percent solids in the resin solution as determined by heating for two hours at 149° C. a 2 gram sample of resin solution diluted with 10 ml. methyl alcohol in an open flat bottom container such as a 2 oz. capacity Gill style.

As a typcial example a conventional aqueous resole solution may have a solids content of about 70% at 149° C., the volatilized portion being largely water including water of condensation engendered during curing, accompanied by minor amounts of phenol, formaldehyde and low molecular phenol alcohols such as saligenin. When such resole solution is subjected to the "cone" test described above, "cone" efficiency values of the order of 58–60% are ordinarily obtained. It is not unusual however for even lower "cone" efficiency values to be found with some water-soluble resole resins, some being as low at 40% "cone" efficiency.

In general, "cone"-efficiency of conventional water-soluble resole resins increases the higher the reacted molar ratio of formaldehyde to phenol. But while resole resins of high reacted formaldehyde ratio offer some improvement, there is still a wide margin between the theoretically possible yields and those obtained under practical working conditions.

It has now been found that conventional water-soluble phenol-formaldehyde resole resins, that is resole resins which can be homogeneously diluted with water to at least a 50% solids content, can be treated in a manner substantially retaining their important water-soluble dilutability character but eliminating therefrom substantial amounts of the components which have been found to retard heat-conversion and to adversely affect the yield of insoluble and infusible resin. The treatment found most effective for this purpose comprises mixing a conventional water-soluble resole resin with a sufficient amount of one or more hydrocarbon liquids or aliphatic ethers which are solvents for phenol and its simple monophenylol derivatives with formaldehyde such as the isomeric monomethylol phenols, e.g. saligenin but which do not or only partly dissolve monophenylols having more than one methylol substituent on the aromatic ring, polyphenylols such as the isomeric dihydroxy diphenyl methanes, or polyphenylols having one or more methylol substituents on the aromatic rings, thereby forming a two-phase mixture, one phase comprising largely a homogeneous mixture consisting of the extractant and the extractibles such as phenol, and monomethylol monophenols; and a second homogeneous phase comprising largely a viscous water-containing, water-soluble resole substantially reduced in its original content of unreacted phenol and monomethylol monophenol constituents and containing a minor amount of the extractant solvent. The extractant is generally removed from the resole phase by distillation at subatmospheric pressure. Removal of the extractant reduces fire hazards in the use of the resole. The extractant can also be removed by mixing the second phase with water whereby the extractant being water insoluble readily separates out and the water and resole form a single phase. Separation of the extractant by straight distillation and/or by steam distillation is preferred however because in such operation undehydrated resole reaction products can be simultaneously partly or completely dehydrated.

A single extraction is often adequate for removing a sufficient amount of extractibles from the water soluble resole to greatly improve its curing speed and percent yield of infusible resinous solids on curing. However, multiple extractions can be used when it is desired to extract the maximum possible amounts of the components which retard curing and lower the yield of infusible solids.

The improved products of the present inventions are those water-soluble resoles which have been extracted to a stage such that the resultant water-soluble resole contains on a calculated dry weight basis at most not more than 2.5% of unreacted phenol and preferably less than 1%; a total amount (including the unreacted phenol) not exceeding 10% and preferably less than 5% by weight of molecules having a molecular weight less than 125; and not more than 10% by weight of molecules having a molecular weight greater than 350.

The conventional water-soluble resole resins benefiting from removal of unreacted phenol ad low molecular weight condensation products are those condensates obtained by reacting together a molar amount of phenol with from 1 to 3 mols of formaldehyde in any of its available commercial forms such as paraform or formalin preferably in the presence of an alkaline catalyst such as sodium hydroxide, or carbonate, barium oxide or hydroxide, quaternary substituted ammonium hydroxide having as the substituents alkyl, aryl or hydroxy-alkyl groups, the reaction being terminated before water-insoluble reaction products are formed. If desired, the alkaline catalyst may be wholly or partly neutralized with mineral or organic acids. More specific details for preparing water-soluble resoles useful in the practice of this invention are disclosed in Bender U.S. Patent 2,034,457; Meharg U.S. Patent 2,190,672 and copending applications by H. M. Shappell Serial No. 276,440, filed March 13, 1952, and Serial No. 327,913, filed December 24, 1952; all these disclosures being incorporated herewith by reference thereto.

On a dry basis, that is, free from water, the conventional water-soluble resoles insofar as we have been able to determine contain a content of unreacted phenol between about 3 and 20% by weight of the resole; a content of unreacted formaldehyde from about 3 to 15% by weight of the resole; a number average molecular weight from about 125 to about 265; and a content of monomethylol monocyclic phenols such as saligenin of at least 10%. When conventional water-soluble resoles are subjected to suitable analytical procedures, it has been found that they contain at least a 15% by weight content and sometimes up to 65% content of molecules having a molecular weight less than 125, and not over a 5% content of molecules having a molecular weight more than 350.

For the purpose of this invention, the conventional resole resins which are to be improved by removing therefrom unreacted phenol and monomethylol monophenols should be miscible with at least an equal quantity of distilled water.

Practically any water-immiscible aliphatic hydrocarbon, aromatic hydrocarbon or halogenated hydrocarbon, and which is a solvent for phenol can be used as an extractant to remove not only unreacted phenol but also monomethylol substituted condensation products of phenol such as saligenin.

The aromatic hydrocarbons such as benzene, toluene and xylene, are ordinarily preferred in that they yield resole products of the highest "cone" efficiency and lowest content of unreacted phenol.

Halogenated hydrocarbons such as carbon tetrachloride, 1-chlorobutane, ethylene dichloride, and 1,1,2-trichloroethane are also suitable for use as extractants, but in general are not as efficient as the aromatic hydrocarbons.

Aliphatic hydrocarbon such as hexane, petroleum ethers, and ligroins are the least efficient solvents for phenol, and preferably should be used in admixture with a more powerful extractant such as toluene or xylol.

Aliphatic ethers having the structure ROR′ where R and R′ are each the same or different alkyl radicals can also be used as extractants, such ethers include dimethyl ether, diethyl ether, methyl ethyl ether, and dipropyl ether.

The extracting efficiency of any of the above extractants and particularly of the less effective aliphatic hydrocarbon extractants can be improved by mixing them with small amounts (1 to 10% by weight thereof) of known organic solvents for the water-soluble resole such as the lower molecular weight aliphatic alcohols, ketones, and esters as exemplified by methyl alcohol, ethyl alcohol, propyl alcohol, butyl alcohol, amyl alcohol, acetone, methyl ethyl ketone, methyl acetate, ethyl acetate, ethyl butyrate, butyl propionate.

The extraction of unreacted phenol and monomethylol products from a water-soluble resole can be conducted as a continuous process. One form of such process employs the extractant in the conventional process of countercurrent-liquid-liquid extraction. Another continuous procedure is to continuously mix together streams of the extractant and an aqueous or organic solvent solution of the resole in proportions forming a turbid mixture at a given temperature about 55° C. or less, cooling the turbid mixture to cause phase separation and then continuously removing the resinous phase from the system.

Several types of batch procedures have been found suitable for removing the undesired constituents from water-soluble resoles. The simplest batch procedure is to mix a sufficient amount of extractant with the resole or its solution in a solvent such as water, alcohol or a ketone to form a two-phase system, separating the resinous phase and removing therefrom the extractant.

Another batch process is to add a slow stream, mist or spray of the resole or its solution in a solvent such as water, ethyl alcohol or acetone to a sufficient amount of the extractant to form a two phase system, the extractant being vigorously agitated during the addition of the resole, then separating the phases and purifying the resole phase to remove its content of extractant.

Yet another batch process is to add the extractant to a resole solution to the first appearance of turbidity, cooling this mixture to cause precipitation of a resole phase which is removed and purified to remove the extractant. This process is otherwise the same hitherto described for a continuous process.

All the extraction processes are quite sensitive to the temperature at which they are conducted both from the standpoint of extraction efficiency and from the extent of chemical changes taking place in the resole. Usually an extraction temperature of about room temperature (20–30° C.) is satisfactory. Extraction however is more efficient the higher the extraction temperature, efficiency being based on the amount of undesired component removed from the resole, by the extractant. But at elevated temperatures, however, which approach or equal the usual reaction temperatures employed in producing resoles, the resole tends to react further and rapidly loses its miscibility in water. Hence, when conducting the extraction at temperatures of the order to 50–80° C., it should be carried out rapidly to minimize the loss in water-miscibility.

The components removed from the resole by any of the extraction procedures herein described can be recovered from the extractant as by distillation or by separation procedures using a solvent for the resole such as water which is insoluble in the extractant. The recovered components namely phenol and monomethylol phenols can be reused for the production of resole resins.

The practice of the invention is further illustrated in the following examples.

Resole "A"

This resole was prepared by reacting at 70° C. for 2 to 2.5 hours 1.1 mols of phenol with 2.2 mols of formaldehyde (as formalin) in the presence of 0.075 mol of sodium hydroxide as catalyst. The reaction product was then dehydrated under a 28" vacuum until 5.5 mols water had distilled off. The alkaline catalyst in this partially dehydrated product was neutralized by adding sufficient aqueous hydrochloric acid to impart a pH value of 7.5 to the reaction mass. The neutralized product was then further vacuum dehydrated until a total of 7 mol water had been removed. The resultant product had the following average properties as determined by examination of several batches:

| | |
|---|---|
| Time to thermoset at 130° C. _____seconds__ | 1220 |
| Solids content (after baking 2 hours at 149° C.) _____percent__ | 70 |
| Efficiency as mineral fiber binder as determined by cone test _____percent__ | 58 |
| Specific gravity _____ | 1.26 |
| Viscosity at 25° C. _____centipoises__ | 500–750 |
| Water-miscibility _____percent__ | 1600–2200 |
| Unreacted formaldehyde _____percent__ | 5 |
| Water _____do____ | 13 |
| Unreacted phenol _____do____ | 5.5 |
| Monomethylol phenols ($C_6H_4OHCH_2OH$) _do____ | 15 |
| Average molecular weight _____ | 190 |
| Content of molecules less than 125 molecular weight _____percent__ | 22 |
| Content of molecules more than 350 molecular weight _____percent__ | 1 |
| Average number of methylol groups per aromatic ring _____ | 1.4 |

Resole "B"

This resole was prepared by reacting for between 3 and 4 hours 1.1 mols phenol with 2.1 mols formaldehyde (as formalin) at 70° C. in the presence of 0.023 mol barium hydroxide. The reaction mixture was then adjusted to a pH value of about 7 by bubbling carbon dioxide gas through the mixture. The neutralized reaction mixture was then dehydrated by heating to 50° C. under sub-atmospheric pressure until 4.5 mols water had been removed. There was then added to the dehydrated product 0.22 mol ethyl alcohol. The filtered product had the following properties:

| | |
|---|---|
| Time to thermoset at 130° C. ____seconds__ | 1820 |
| Solids content (after baking 2 hours at 149° C.) _____percent__ | 60 |
| Efficiency as mineral fiber binder, as determined by "cone" test _____percent__ | 42 |
| Specific gravity _____ | 1.17–1.18 |
| Viscosity at 25° C. _____centipoises__ | 40–60 |
| Water-miscibility _____percent__ | 300–400 |
| Water _____do____ | 19 |
| Unreacted formaldehyde _____do____ | 4 |
| Unreacted phenol _____do____ | 13.2 |
| Monomethylol phenols ($C_6H_4OHCH_2OH$) percent__ | 20 |
| Average molecular weight _____ | 160 |
| Content of molecules less than 125 molecular weight _____percent__ | 36 |
| Content of molecules more than 350 molecular weight _____percent__ | 1 |
| Average number of methylol groups per aromatic ring _____ | 1.7 |

The following examples illustrate the extraction of unreacted phenol and low-molecular weight condensate from Resoles "A" and "B."

*Example 1.*—This example illustrates extraction by precipitation of the resole into an extractant.

A solution consisting of 7,000 g. of Resole "A" dissolved in 8400 ml. of ethanol was added in a very fine stream to 44.3 gallons of vigorously agitated benzene contained in a 150-gallon stainless steel kettle. After the addition was completed, the mixture was agitated for 1–2 more hours, the two phases permitted to separate, and the resinous phase removed through a flush valve in the bottom of the kettle. The resinous phase was redissolved in 8400 ml. of ethanol and reprecipitated into 44.3 gallons of fresh benzene in the same manner. The resin phase from the second precipitation was dried under 20 mm. vacuum at room temperature. During the "drying" period, the resin was thinned with several 100 ml. portions of water to insure complete removal of the extracting solvents.

The properties of the resole after being subjected to the second precipitation are as follows:

| | |
|---|---|
| Time to thermoset at 130° C. ____seconds__ | 635 |
| Efficiency as mineral fiber binder as determined by "cone" test _____percent__ | 70.7 |
| Water-miscibility _____do____ | 1400–2000 |
| Water _____do____ | 13 |
| Unreacted formaldehyde _____do____ | 1 |
| Unreacted phenol _____do____ | 0.17 |
| Monomethylol phenols ($C_6H_4OHCH_2OH$) percent__ | 4 |
| Average molecular weight _____ | 225 |
| Content of molecules less than 125 molecular weight _____percent__ | 5.2 |
| Content of molecules more than 350 molecular weight _____percent__ | 1.2 |
| Average number methylol groups per aromatic ring _____ | 1.7–1.8 |

Subjecting the twice extracted resole to a further drying operation at 10 mm. Hg pressure and at room temperature for three hours yielded a product of even higher "cone" efficiency together with a still lower content of unreacted phenol and formaldehyde. The properties of this exhaustively dried resole are as follows:

| | |
|---|---|
| Efficiency as mineral fiber binder as determined by "cone" test _____percent__ | 73.5 |
| Water _____do____ | 2.5 |
| Unreacted formaldehyde _____do____ | 0.8 |
| Unreacted phenol _____do____ | 0.05 |
| Average molecular weight _____ | 235 |
| Average number methylol groups per aromatic ring _ | 1.9 |

*Example 2.*—This example illustrates a batch extraction procedure by direct intimate mixing of the resole and the extractant.

50 g. of Resole A were extracted with 1200 ml. of diethyl ether by shaking the two phases together vigorously for 15 minutes in a 2-liter separatory funnel. After the two phases had been allowed to separate, the bulk of the resinous phase was drawn off through the stopcock, and the ether layer was then decanted off through the top of the funnel. The remaining resole was washed out of the apparatus with 20 ml. of distilled water; and the resole and washings were then evaporated down under vacuum to remove residual ether.

The properties of the extracted resole are as follows:

| | |
|---|---|
| Time to thermoset at 130° C. ____seconds__ | 610 |
| Efficiency as mineral fiber binder as determined by "cone" test _____percent__ | 71.2 |
| Water miscibility _____percent__ | 1400–2000 |
| Unreacted phenol _____do____ | 0.2 |
| Unreacted formaldehyde _____do____ | 1 |
| Monomethylol phenols ($C_6H_4OHCH_2OH$) percent__ | 4 |

| | |
|---|---|
| Average molecular weight | 230 |
| Content of molecules less than 125 molecular weight ........................percent.. | 5 |
| Content of molecules more than 350 molecular weight .........................percent.. | 1.2 |
| Average number methylol groups per aromatic ring | 1.8 |

*Example 3.*—This example describes an extraction procedure effecting precipitation of a dehydrated resole by addition of a precipitant.

700 g. of resole A were diluted with 50 ml. of methanol and 200 ml. of toluene and evaporated down under 10 mm. Hg vacuum at room temperature to remove the major content of the water. The dehydrated resole was dissolved in a mixture consisting of 3000 ml. of methanol and 9000 ml. of toluene. To this solution in a 12-liter 3-neck round-bottom flask maintained at −3° C. were added, very slowly 360 ml. of toluene. The vigorous agitation employed during the addition was continued for an additional 1–2 hours, and the mixture then allowed to separate into two sharply defined phases. The gel (resinous) phase was then removed and dried at −10 mm. Hg pressure and at room temperature. Two 100 ml. portions of distilled water were added during the evaporation period to insure complete solvent removal.

Properties of the resole after extraction are as follows:

| | |
|---|---|
| Percent efficiency as mineral fiber binder as determined by "cone" test | 66 |
| Average molecular weight | 216 |

*Example 4.*—This example is an illustration of an extraction process wherein the resole is first dissolved in a solvent (methyl alcohol), then an extractant (toluene) is added to the solution in an amount insufficient to cause precipitation and then precipitation is caused by evaporating off a sufficient amount of the solvent from the mixture to cause precipitation of the resole.

580 g. of Resole "A" were diluted with 100 ml. of methanol and evaporated down under 10 mm. Hg pressure at room temperature. Additional 100 ml. portions of methanol were added and evaporated off in like manner until the moisture content of the resin had been reduced to 0.5%.

The dehydrated resole resin (535 g.) was extracted at −3° C. with 10 liters of toluene containing 2.5% methanol to remove the bulk of the low mol. wt. species. The extracted residue was dissolved in a mixture of 2200 ml. of methanol and 8000 ml. of toluene (in a 12-liter 3-neck round-bottom flask) and maintained at −3° C., agitation was started, and a stream of nitrogen (or other inert gas) was passed across the surface of the solution for 4 hours at a rate of 0.1 cubic foot per minute. Agitation was continued for an additional 1–2 hours, and the system then allowed to separate into two well-defined phases. The phase was removed and purified by being subjected to sub-atmospheric pressure to remove toluene and methanol residues.

The final product of Example 4 exhibited the following properties:

| | |
|---|---|
| Percent efficiency as mineral fiber binder as determined by "cone" test | 75 |
| Percent water | 19.2 |
| Percent unreacted formaldehyde | 0.2 |
| Percent unreacted phenol | <0.05 |
| Average molecular weight | 245 |
| Average number methylol groups per aromatic ring | 1.7 |

By repeating the same precipitation technic described in Example 4 for two more times on the extracted resole product of Example 4, it was found possible to remove further amounts of the lower molecular weight components and this highly purified product had a "cone" efficiency value of 80.5%. Other properties of this product are as follows:

| | |
|---|---|
| Percent water | 0.8 |
| Percent unreacted phenol | 0.05 |
| Average molecular weight | 310 |

*Example 5.*—A 2000 gram charge of Resole "B" was extracted as described in Example 1 with the exception that the resole was not diluted with alcohol prior to each precipitation.

The twice-extracted resole had the following properties:

| | |
|---|---|
| Time to thermoset at 130° C. .............seconds... | 1280 |
| Percent efficiency as mineral fiber binder as determined by "cone" test | 56.6 |
| Water-miscibility ........................percent... | 300 |
| Percent unreacted formaldehyde | 3 |
| Percent unreacted phenol | 0.6 |
| Percent monomethylol phenols ($C_6H_4OHCH_2OH$) | 4.2 |
| Average molecular weight | 210 |
| Percent content of molecules less than 125 molecular weight | 7.8 |
| Percent content of molecules more than 350 molecular weight | 1.6 |
| Average number methylol groups per aromatic ring | 2.3 |

Comparison of the property data accompanying each example with the data on original Resoles "A" and "B" shows that extraction of unreacted phenol and condensation products of low molecular weight (below 125) resulted in significant improvements in the treated resoles particularly as regards faster curing speed and percent yield of infusible resin solids on heat-curing.

The higher yields of cured solids and the faster curing speeds are of definite economic values in the use of these resins as binders or sizings for mineral and organic fibers, as adhesives and/or binders in the manufacture of laminates from wood, paper, cloth and similar fibrous matter, as thermoset binders in brake lining constructions, and, in general, for practically all uses heretofore proposed for conventional water-soluble resole resins.

What is claimed is:

1. Process which comprises admixing a water-soluble, water-containing, resinous, resole condensation product of phenol and formaldehyde, containing unreacted phenol and unreacted formaldehyde and having more than about 10 percent by weight of organic molecules with a molecular weight of less than 125 and having less than about 10 percent by weight of organic molecules having a molecular weight of more than 350, with a sufficient amount of a water-immiscible organic solvent selected from the group consisting of aliphatic hydrocarbons, aromatic hydrocarbons, halogenated hydrocarbons, and aliphatc ethers having the structural formula ROR' wherein R and R' each represents an alkyl radical, to form a two phase mixture, one phase comprising the said organic solvent containing organic extractives, the second phase comprising the water-soluble, water-containing, resinous, resole condensation product containing less than about 10 percent by weight of organic molecules having a molecular weight less than 125 and less than about 10 percent by weight of organic molecules having a molecular weight greater than 350, said condensation product being homogeneously dilutable with water to at least a 50 percent solids content, and separating the said phases.

2. Process as defined in claim 1 wherein the organic solvent is benzene.

3. Process as defined in claim 1 wherein the organic solvent is diethyl ether.

4. Process as defined in claim 1 wherein the organic solvent is toluene.

5. Process which comprises admixing a water-soluble, water-containing, resinous, resole condensation product of phenol and formaldehyde containing unreacted phenol and unreacted formaldehyde and having more than about 10 percent by weight of organic molecules with a molecular weight of less than 125 and having less than about 10 percent by weight of organic molecules having a molecular weight of more than 350, with a stream of a water-immiscible organic solvent selected from the group consisting of aliphatic hydrocarbons, aromatic hydrocarbons, halogenated hydrocarbons, and aliphatic ethers having the structural formula ROR' wherein R and R' each represents an alkyl radical, in an amount sufficient to form a turbid mixture, cooling said turbid mixture to cause a two-phase separation, one phase comprising the said organic solvent containing organic extractives, the second phase comprising the water-soluble, water-containing, resinous, resole condensation product containing less than about 10 percent by weight of organic molecules having a molecular weight less than 125 and less than about 10 percent by weight of organic molecules having a molecular weight greater than 350, said condensation product being homogeneously dilutable with water to at least a 50 percent solids content, and separating the said phases.

References Cited in the file of this patent

UNITED STATES PATENTS

| | | |
|---|---|---|
| 2,034,457 | Bender | Mar. 17, 1936 |
| 2,120,343 | Wolfe | June 14, 1938 |
| 2,190,672 | Meharg | Feb. 20, 1940 |
| 2,636,017 | Schwartzberg | Apr. 21, 1953 |
| 2,758,101 | Shappell | Aug. 7, 1956 |

FOREIGN PATENTS

| | | |
|---|---|---|
| 629,467 | Great Britain | Sept. 21, 1949 |

OTHER REFERENCES

Granger: Ind. Eng. Chem., April 1932, pp. 442–7.
Martin: Journal Am. Chem. Soc., June 20, 1952, vol. 74, pp. 3024–5.